United States Patent
Pérez Díaz et al.

(10) Patent No.: US 10,181,781 B2
(45) Date of Patent: Jan. 15, 2019

(54) ENHANCED MAGNETIC VIBRATION DAMPER WITH MECHANICAL IMPEDANCE MATCHING

(71) Applicant: MAG SOAR S.L., Madrid (ES)

(72) Inventors: José Luis Pérez Díaz, Madrid (ES); Ignacio Valiente Blanco, Madrid (ES); Cristian Crisache, Madrid (ES); Efrén Díez Jiménez, Madrid (ES)

(73) Assignee: MAG SOAR S.L., Madrid (ES)

(*) Notice: Subject to any disclaimer, the term of this patent is extended or adjusted under 35 U.S.C. 154(b) by 321 days.

(21) Appl. No.: 15/160,948

(22) Filed: May 20, 2016

(65) Prior Publication Data

US 2017/0085167 A1   Mar. 23, 2017

(30) Foreign Application Priority Data

Sep. 23, 2015 (EP) .................................... 15382461

(51) Int. Cl.
   *H02K 49/04* (2006.01)
   *F16F 6/00* (2006.01)

(52) U.S. Cl.
   CPC ........... *H02K 49/043* (2013.01); *F16F 6/005* (2013.01)

(58) Field of Classification Search
   CPC .............................. H02K 49/043; F16F 6/005
   USPC .......... 188/267; 267/140.14, 140.15
   See application file for complete search history.

(56) References Cited

U.S. PATENT DOCUMENTS

| | | | |
|---|---|---|---|
| 4,199,128 A | | 4/1980 | Van Den Boom et al. |
| 4,314,623 A | * | 2/1982 | Kurokawa ............... G12B 3/00 188/267 |
| 4,432,441 A | * | 2/1984 | Kurokawa ............. F16F 6/005 188/267 |
| 4,517,505 A | | 5/1985 | Cunningham |
| 4,875,655 A | | 10/1989 | Bender et al. |
| 4,938,463 A | | 7/1990 | Miyamoto |
| 5,736,798 A | | 4/1998 | O'Brien et al. |
| 6,003,849 A | * | 12/1999 | Davis ........................ F16F 9/10 188/266.7 |
| 6,491,290 B2 | | 12/2002 | Muramatsu et al. |
| 6,588,554 B2 | * | 7/2003 | Fujita ...................... F16F 6/005 188/267 |
| 8,941,251 B2 | * | 1/2015 | Zuo ......................... B60G 17/06 290/1 R |
| 9,035,732 B2 | * | 5/2015 | Satou ................... H02K 41/031 335/229 |
| 9,252,649 B2 | * | 2/2016 | Kakiuchi ................. F16F 6/00 |
| 2002/0089105 A1 | * | 7/2002 | Fujita ...................... F16F 6/005 267/140.14 |

(Continued)

*Primary Examiner* — Thomas J Williams
*Assistant Examiner* — Mariano Sy
(74) *Attorney, Agent, or Firm* — Cantor Colburn LLP

(57) ABSTRACT

Magnetic vibration damper includes three coaxial elements: a first coaxial element with first permanent magnets, a second coaxial element with first soft magnets and a third coaxial element with second permanent magnets. The first soft magnets are located between the first permanent magnets and the second permanent magnets in a radial direction. The spacing of the second permanent magnets is larger than the spacing of the first permanent magnets. The damper further includes an energy conversion component, such as conductive layers or coils to convert the mechanical movement of the magnets into heat or electric current.

15 Claims, 10 Drawing Sheets

(56) References Cited

U.S. PATENT DOCUMENTS

| | | | |
|---|---|---|---|
| 2004/0012134 A1* | 1/2004 | Fujita | F16F 9/535 267/140.14 |
| 2006/0124413 A1* | 6/2006 | Namuduri | B60G 17/0152 188/267 |
| 2007/0175716 A1* | 8/2007 | Kim | B60G 13/14 188/267 |
| 2007/0241489 A1* | 10/2007 | Mizushima | F16F 15/03 267/140.14 |

* cited by examiner

ENHANCED MAGNETIC VIBRATION DAMPER WITH MECHANICAL IMPEDANCE MATCHING

CROSS-REFERENCE TO RELATED APPLICATIONS

This application is related to and claims the benefit of Spanish Patent Application No. EP15382461.0, filed on Sep. 23, 2015, the contents of which are herein incorporated by reference in its entirety.

TECHNICAL FIELD

The present disclosure has its application within the mechanical sector, especially, in the industrial area engaged in providing vibration dampers.

BACKGROUND

Vibrations are ubiquitous in mechanical devices, machinery and vehicles, being generated for example by engines, motors, unbalanced rotors, roughness of the road, turbulences, etc. In most cases, these vibrations need to be damped or attenuated for an adequate performance of such devices. For instance, in case that an aircraft engine loses a blade and becomes unbalanced, vibrations in the aircraft need to be damped enough to let the pilot control the aircraft. In other few cases, controlled vibrations are purposely generated, such as relaxing coaches, powder transport, percussive drilling, etc.

Vibration transmission and damping has been therefore thoroughly studied in the field of mechanical engineering. Any rigid structure or mechanical system behaves as a vibration path or "circuit" for an oscillatory excitation being characterized by its mechanical impedance defined as the ratio between force and speed. There are three well-known kinds of elements: stiff elements, masses and dampers that can be combined to provide a total mechanical impedance for the system. Mechanical impedance depends on the frequency of the excitation. In the case of a viscous damper its mechanical impedance or damping ratio between the force exerted by the damper and the speed at which it is being elongated (or shortened) is constant for a broad range of frequencies.

A useful parameter to determine the resultant transmission of vibrations in a structure or bench is the transmissibility, defined as the ratio between the exerted force by such a structure or bench to its support divided by the force exerted by the source of vibrations on the structure or bench.

If a viscous damper with a large damping ratio is provided to a structure, then the greater the damping ratio is, the larger the energy dissipation and the lower the quality factor of the resonance. It is well known that damping reduces the maximum value of transmission—lightly shifting the frequency of resonance where such a maximum occurs—but increases the transmission coefficient in the high frequency regime. In other words, the use of a viscous damper reduces the transmissibility at frequencies around that of resonance but enhances the transmissibility in the high frequency regime. Additionally, the use of a viscous damper does not affect to the transmissibility in the very low frequency regime. For example, the well-known viscous oil dampers are used in automobiles in order to prevent resonance.

The simplest way to reduce vibrations transmission, for example from a rotating machine to the ground is to reduce the stiffness of the ground-connections. In this sense, elastic coupling is extensively used in industry and buildings. Typically a floating bench is used to support any vibrating machinery. In general, quite good vibration isolation can be obtained by appropriate design of these benches. However, when low frequency vibrations need to be suppressed, this approach becomes ineffective.

An alternative technology is dynamic vibration absorbers. They are designed to resonate absorbing part of the transmitted force. Adding damping to the absorber widens the bandwidth where the vibration isolation is effective. Again, these systems are only effective at the resonant frequency and they have worsening the behaviour in other regimes.

Additionally, there are particularly demanding environments where damping and control of vibrations remain unsolved problems. For instance, fuselage-mounted turbofans require a very efficient isolation system in order to assure a reduction in the transmission of the vibrations to the aircraft structure, but the high temperature of the engine (which can be as high as 650° C. close to the engine) prevents the use of most of systems like those based on viscous or viscoelastic materials.

Elastomeric materials with a high damping coefficient have been also used for example in the system disclosed in U.S. Pat. No. 4,199,128 A. However, they are limited by environmental conditions such as the operation temperature (typically operational temperature range from −55 to 70° C.) or the attack of engine fluids. Special silicones are able to work for a short time at even 150° C. Beyond that temperature, they present creep or drift and fatigue, exhibit nonlinear behaviour which is strongly dependent on frequency, temperature and loading conditions such as preloads and amplitude of motion. Alternatively, U.S. Pat. No. 6,491,290 B2 and U.S. Pat. No. 4,938,463 A present vibration chambers with fluid-filled chambers, but those systems present similar limitations to elastomer-based mounts in terms of temperature range and lifespan. Aerospace engines mounts—as for example that described in U.S. Pat. No. 4,875,655—hold the engine in the most severe flight conditions with high stiffness but no damping. This results in very reduced vibration isolation typically lower than 10 dB for low frequencies. There is a clear need of a damper suitable for this severe flight conditions.

Other currently used devices are active systems where an actuator (most frequently electromagnetic or piezoelectric) is driven to compensate the incoming vibration. These systems can be installed in parallel or in series with the connecting elements. However, the design of the feedback control loop is not an easy issue and required advanced signal control knowledge and power electronic systems. They need to be provided with a vibration sensor and an electronics processor that generates the compensating signal to command the active actuator. Typical drawbacks of electromechanical active systems include their high cost and weight and the requirement of control and sensing systems to operate with relatively high power consumption. Piezoelectric actuators are also used and able to provide higher forces. However, they are limited in the deformation they suffer. Therefore, this type of actuator frequently requires displacement amplification devices. Usually, they are stacked actuators, compliant mechanisms or hydraulic systems are preferred as amplifying systems to isolate "large-amplitude" vibrations. Each of these amplifying systems has their own limitations, including the temperature dependence of the strain (or deformation), the high voltages required, and the resulting non linearities and creep. Furthermore, these piezoelectric amplified actuators tend to be bulky, heavy and of complex design, limiting their applicability.

Semiactive-systems provide an alternative approach wherein only a parameter is changed as a function of the vibration conditions, saving power and requiring smaller control devices—for instance viscosity and damping coefficient using magnetorheological materials. Even though active and semiactive systems are more expensive and complex, they achieve vibration reductions of the order of 25 dB while passive systems typically achieve vibration isolation not better than 10-15 dB. Their main limitation is again the limited range of temperature for which sensors and active actuators can operate and survive.

An alternative approach is to use magnetic dampers based on eddy currents power loss in a conductor exposed to an alternating magnetic field, such as those disclosed by U.S. Pat. No. 4,517,505 A or U.S. Pat. No. 5,736,798 A. Arrangements of permanent magnets oscillating inside a conductive element are the most common design for this kind of devices. Some advantages of eddy current dampers are that they can operate from low temperatures up to above 300° C., they are fully passive and do not present contact between moving parts, minimizing wear and fatigue. In these devices, the kinematic energy in vibrating elements is dissipated as heat. However, power loss is proportional to the square of the speed of the oscillation what makes them useful only for relatively high frequencies but not very useful for damping of low frequency vibrations.

SUMMARY

The disclosure solves all the aforementioned problems by disclosing a magnetic vibration damper with at least three coaxial elements:
- A first coaxial element with at least a plurality of first permanent magnets equally spaced along the axis direction.
- A second coaxial element with at least a plurality of first soft magnets, such as ferromagnetic elements, equally spaced along the axis direction.
- A third coaxial element with at least two second permanent magnets.

Depending on the number of permanent and soft magnets in the different elements, the displacement of one element is multiplied or reduced r times, "r" being the linear displacement reduction ratio that depends on the number of permanent magnets in the first and third coaxial elements and the number of soft magnets in the second coaxial element as it will be explained below. With the disclosed configuration, when an axial force tries to induce a relative movement between the first coaxial element and the second coaxial element, the third coaxial element is also displaced but r times faster.

The alternative variation of magnetic flux generated by the movement of the third coaxial element can then be dissipated by the conversion of this alternative magnetic flux into electric current and/or heat through conversion means such as coils or conductive materials. The speed of the alternative magnetic flux is r times faster than the speed of the oscillatory input element. This multiplication in the speed assures a much more effective eddy current dissipation than a simply direct eddy current damper. Mechanical power is therefore effectively converted into heat, damping any vibration affecting the device.

In addition to kinetic to electric energy converters as previously described, other energy conversion means can be internally or externally connected to the third coaxial element as, for example, a kinetic to thermal energy converter such as a viscous damper or an elastomeric mount; and/or a kinetic to elastic energy converter such as a mass-spring system.

The increase in the speed of the third coaxial element contributes to the efficiency of the vibration damping optimally matching mechanical impedances. Due to the multiplication of the speed of the third coaxial element, any external or internal damping system intended to increase the damping of the total system can be downsized, reducing weight and cost.

This can be better understood in terms of an analogy between mechanical impedances and electric impedances. In the same way that electrical transformers divide voltage and multiply current or vice versa, the device disclosed in the present disclosure divides force and multiplies speed. There is no mechanical device known in the state of the art capable of performing such an equivalent coupling due to backlash.

In the present disclosure, the mechanical speed multiplication is done in the absence of contact. Therefore, there is no backlash, no wear and it does not need lubrication. The absence of lubrication makes the device suitable for working in very high and very low temperatures where lubricants typically fail or in clean areas where lubricants are not desirable.

In some embodiments, the distance between the second permanent magnets is greater than the spacing between the first permanent magnets and greater than the spacing between the first soft magnets.

Preferably, within a unitary length (L), defined as twice the distance between the centres of the two second permanent magnets of the third coaxial element, there is a first integer number of first permanent magnets in the first coaxial element and a second integer number of first soft magnets in the second coaxial element. The first integer number and the second integer number verify that their absolute difference equals one. That is, within the unitary length, there is either one first permanent magnet more than or one first permanent magnet less than first soft magnets. This configuration enables to match the impedance of the damper, that is, the speed conversion between the first coaxial element and the third coaxial element, provided that the second coaxial element is fixed.

Notice that the presence of first permanent magnets and second permanent magnets is not necessarily limited to one unitary length. Said first permanent magnets and second permanent magnets can extend to any arbitrary length while maintaining constant spacing. Preferably, the first permanent magnets and second permanent magnets extend for a length of $(N+1/2) \cdot L$, being N the number of second permanent magnets of the third coaxial element. Said number of second permanent magnets is preferably an even number, as removing a permanent magnet of a couple would reduce the force capacity of the damper, although configurations with an odd N can be implemented within the scope of the present disclosure.

The first soft magnets are located between the first permanent magnets and the second permanent magnets. For example, assuming a preferred cylindrical configuration with the first coaxial element in the centre of the system, the first permanent magnets of the first coaxial element are plurality of rings closest to the axis, the first soft magnets of the second coaxial element are a plurality of rings with a larger inner diameter than the outer diameter of the first permanent magnets, and the second permanent magnets of the third coaxial element are a plurality of rings with a larger inner diameter than the outer diameter of the first soft magnets. Nevertheless, notice that in other preferred implementations, the third coaxial elements can either be the closest element to the axis; or there can be two third coaxial elements, one closest to the axis and one furthest from said axis; with the rest of the elements being positioned accordingly to ensure the presence of first soft magnets between the first permanent magnets and the second permanent magnets. In other preferred embodiments of the damper, the damper may comprise multiple alternating layers of first permanent magnets and first soft magnets.

Notice that other equivalent geometries for the permanent and soft magnets are possible beyond the annular configuration, such as polygonal geometries with a common central axis.

Preferably, the first permanent magnets and the second permanent magnets are axially polarized, that is they are polarized in a direction parallel to the direction of the axis of the damper. Nevertheless, other particular implementations of the disclosure may comprise permanent magnets polarized in a direction perpendicular to the axis, that is, a radial polarization in the case of annular magnets. It should be noted that both polarisations are similar in performance, but one polarization may be more convenient than the other depending on the external magnetic contamination, since one contaminates radially and the other axially.

Particular implementations of the disclosure may comprise prisms and/or planar magnets instead of rings, while still maintaining the element distribution of the disclosure. In this case, the axial polarization could also be referred to as longitudinal polarization, whereas the perpendicular polarization would be equivalent to the radial polarization of annular magnets.

Regardless of the particular layer geometry of the damper, as indicated before, the preferred options to dissipate the generated magnetic flux are:

An outer conductive element, such as, for example, a hollow copper cylinder. The movement of the second permanent magnets generates a variation of magnetic flux through the wall of the hollow cylinder, generating eddy currents. These eddy currents are dissipated because of the Ohm law and therefore the energy is transformed into heat that will be dissipated to the environment by convection or radiation. More preferably, the outer conductive element comprises a plurality of fins to increase the heat convection transfer.

One or more coils that convert magnetic flux variations into electric current. These coils are connected to any kind of electric load or equipment through electric wires. Such electric load or equipment can be away. This option has the advantage that the power is consumed or dissipated in the electric load and not in the device. For example, the device can be immersed in water or in an explosive atmosphere while the electric load or equipment can be in a dry and non-explosive environment. Also for example, in an environment where it is inconvenient to generate heat, like a cryostat, the device can operate normally while the heat is generated by the electric load outside this critical environment.

Regardless of the particular layer geometry of the damper, additional soft magnets can be incorporated to the first coaxial element and/or the second coaxial elements. Also, in some embodiments the soft magnets are incorporated to either the first or the third coaxial elements but not to the other. These cases where additional soft magnets are incorporated have the advantage that the damping force is higher.

In the third coaxial element: at least a second soft magnet between the at least two second permanent magnets, and two third soft magnets in the extremes of the at least two second permanent magnets. For a greater number of second permanent magnets, this configuration can obviously be expanded with alternating soft and permanent magnets, with soft magnets in both extremes.

Preferably, the at least one second soft magnet and the two third soft magnets have the same inner diameter as the at least two second permanent magnets, and a smaller outer diameter as said at least two second permanent magnets. More preferably, the resulting axial thickness of the second and third soft magnets is approximately half the radial thickness of the second permanent magnets (that is, the thickness along a direction perpendicular to the axis).

Also preferably, the axial thickness of the second soft magnet or magnets (that is, the soft magnets between two permanent magnets) is double the axial thickness of the third soft magnets (that is, the soft magnets on the extremes). More preferably, the axial thickness of the second soft magnets covers approximately all the distance between two nearby second permanent magnets.

In the first coaxial element: alternating first permanent magnets and fourth soft magnets along the axial direction.

The disclosed magnetic vibration damper converts vibration mechanical movement into a faster vibration mechanical movement that is converted more efficiently into heat or electric energy, providing tunable and efficient damping of any vibration affecting the damper. It provides a flexible impedance matching. Inherent magnetic damping associated to magnetic hysteresis can optionally be included and be tuned by design. There is no wear and no need for maintenance or lubricant. The lack of contact provides almost maintenance-free solution for an extended operation life. The damper can operate from very low temperatures to relatively high temperatures without significant changes in its performance. Electromagnetic interference (EMI) can be reduced to almost zero with an appropriate isolation system.

An additional advantage of the present disclosure is that it reduces transmissibility simultaneously at low and high frequencies regimes.

In some embodiments, the third coaxial element is internally or externally connected to another damper or damping system, such as a mass-spring damper or an hydraulic damper. Due to the multiplication of the speed of the third coaxial element, any of these damping systems can be downsized, reducing weight and cost.

The different aspects and embodiments of the disclosure defined in the foregoing can be combined with one another, as long as they are compatible with each other.

Additional advantages and features of the disclosure will become apparent from the detailed description that follows.

BRIEF DESCRIPTION OF THE DRAWINGS

For the purpose of aiding the understanding of the characteristics of the disclosure, according to a preferred practical embodiment thereof and in order to complement this description, the following figures are attached as an integral part thereof, having an illustrative and non-limiting character.

DETAILED DESCRIPTION OF THE DRAWINGS

In order to simplify the description of the preferred embodiments of the present disclosure, the first coaxial element (1) is referred to as slow-moving element (1), the second coaxial element (2) is referred as stator (2), and the third coaxial element (3) is referred to as fast-moving element (3). However, since 'stator' typically refers to an element whose position remains fixed, those of ordinary skill in the art will recognize the actual function of each coaxial element may vary depending on which coaxial element is mechanically fixed. For example, in particular embodiments of the disclosure, the first coaxial element (1) could be fixed to the ground and therefore be used as stator, while the second coaxial element (2) moves freely along the axis. The following examples are therefore meant to describe the relations between the coaxial elements, but not to limit their attachment to other external fixed or moving elements.

Figure 1:
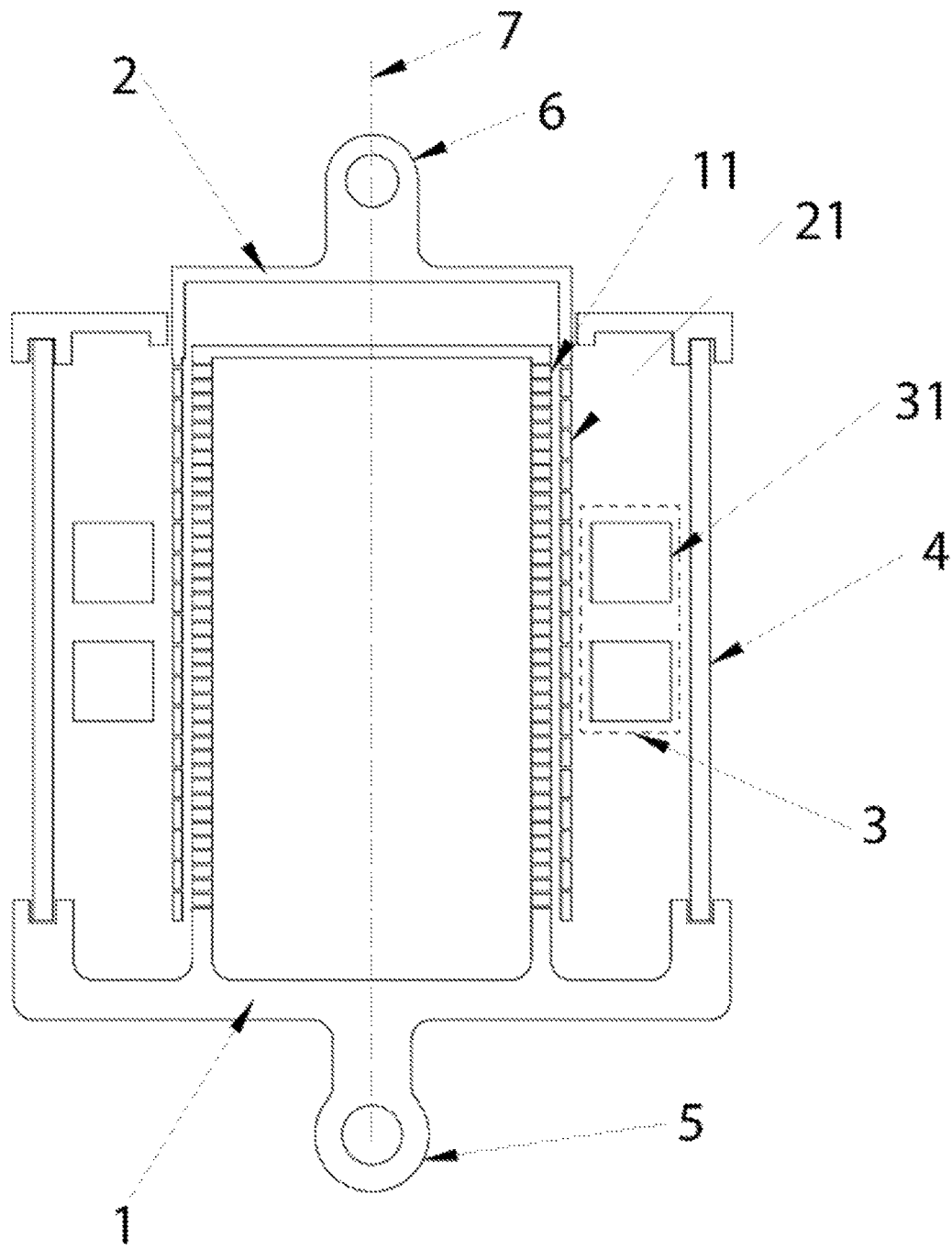
FIG. 1 shows a cross-section of a first particular embodiment of the damper of the disclosure with a hollow conductive cylinder and the first coaxial element as the innermost element.

FIG. 1 presents a cross-section of a first implementation of the magnetic damper of the disclosure. The damper comprises three main coaxial elements with magnets, namely a slow-moving element (1), a stator (2) and a fast-moving element (3). In this case, the slow-moving element (1) is the innermost coaxial element, whereas the fast-moving element (3) is the outermost coaxial element of the three. Surrounding all of them, there is a conductive element (4), such as a hollow copper cylinder. The conductive element is mounted on the slow-moving element (1), although other mechanical configurations can be implemented as long as the fast-moving element can move freely relative to said conductive element (4). For example, in alternative embodiments, the conductive element (4) can be mounted on the stator or on an independent mount separate from the other elements. The slow-moving element (1) comprises first linkage means (5) and the stator (2) comprises second linkage means (6). As linkage means different conventional solutions like spherical bearings, rod ends, hooks, devises, threaded holes can be considered. For the sake of the explanation, we consider that the first linkage means (5) are connected to the source of the vibration and that the second linkage means (6) are connected to a fixed point where vibrations must be damped.

The slow-moving element (1) comprises a plurality of first permanent magnets (11), which are equally spaced in the direction of the axis (7) of the system. The stator (2) comprises a plurality of first soft magnets (21), also equally spaced in the direction of the axis (7), although notice that the spacing is different from that of the case of the slow-moving element (1). Finally, the fast-moving element (3) comprises two second permanent magnets (31), although as previously mentioned, a greater number of second permanent magnets (31) could be implemented.

Figure 2:
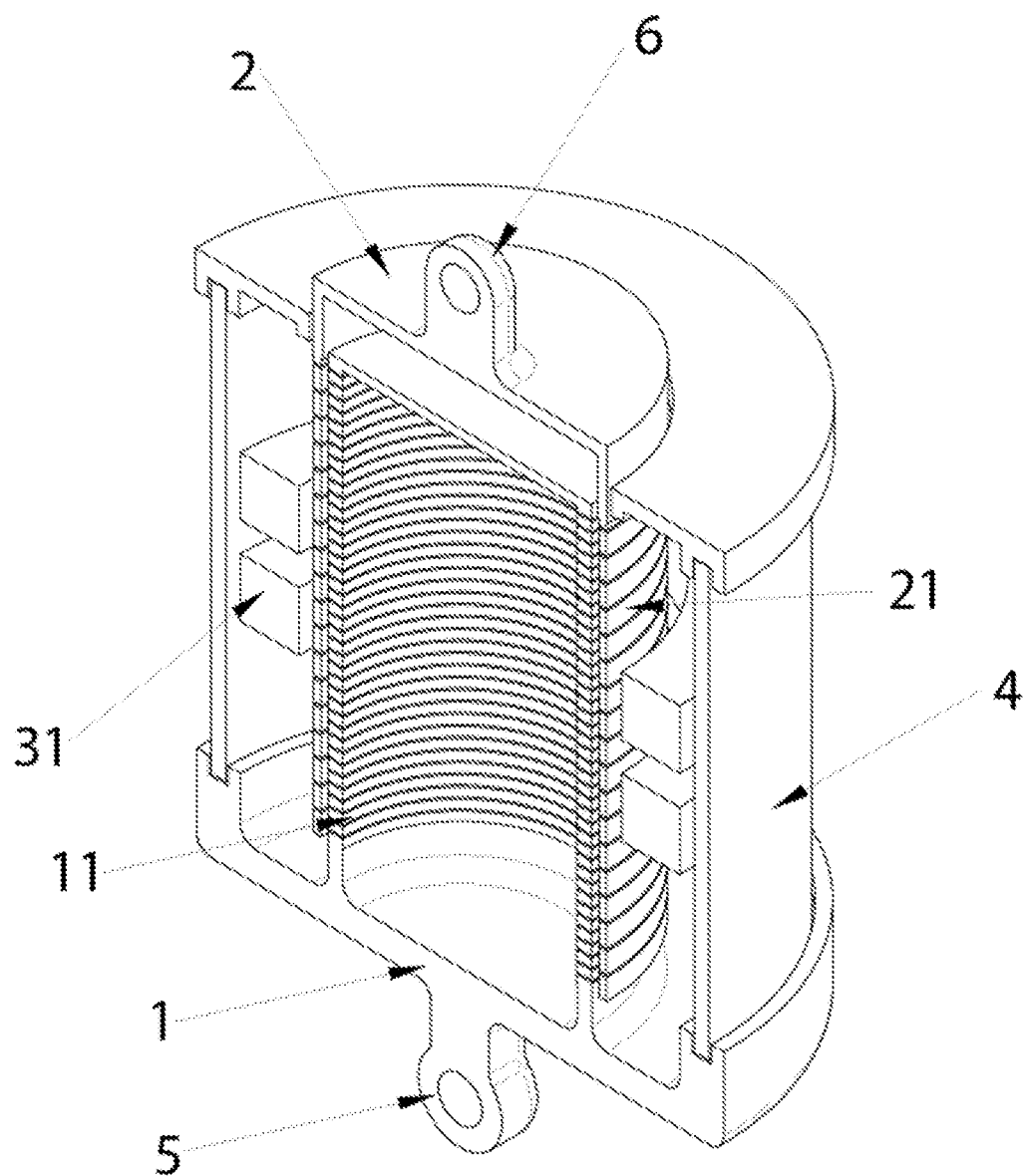
FIG. 2 presents in perspective the cross-section shown in FIG. 1, for a particular embodiment with annular magnets.

All the aforementioned elements are also observed in perspective in the cross-section displayed in FIG. 2. The annular shape of all the involved magnets is clearly observed therein, although variations on this geometry such as a curved axis or polygonal magnets could also be implemented.

Let's consider the unitary length L as double the distance between the two second permanent magnets (31) of the fast-moving element (3). Within said unitary distance, the slow-moving element (1) comprises $n_1$ first permanent magnets (11) and the stator (2) comprises $n_2$ first soft magnets (21), where $n_1$ and $n_2$ are integers whose absolute difference is one. That is, $n_1$ is either one unit greater or smaller than $n_2$. When a vibration occurs, a relative displacement is induced between the slow-moving element (1) and the stator (2), also resulting in a displacement of the fast-moving element (3). Given the geometry and spacing of the damper, an impedance matching ratio r is obtained as follows:

$$r=(n_1-n_2)/n_1$$

This ratio also defines the ratio between the speed of the slow-moving element (1) and the fast-moving element (3). Since $|n_1-n_2|=1$, the speed of the fast-moving element (3) is increased by a factor of $n_1$.

The movement of the fast-moving element made of second permanent magnets (31) generates eddy currents that can then be dissipated as heat into the environment by the conductive element (4). As the dissipated power by eddy current generation depends on the square of the speed of the magnets inducing the magnetic flux, the dissipated factor is multiplied by a factor of $1/r^2$ with respect to the power directly dissipated if the second permanent magnets were directly attached to the vibrating linkage (5).

Any equivalent kinematic inversion can also be easily configured. For instance, if it is the first coaxial element (1) that is fixed, acting as stator, the ratio r' defined as the ratio between the speed of the second coaxial element (2) and that of the third coaxial element (3) is determined by:

$$r'=(n_2-n_1)/n_2$$

The damper can operate from very low temperatures (−200° C.) to relatively high temperatures. For example, implementing permanent magnets with NdFeB magnets, they can operate from −200° C. up to 350° C., while ferrite-based soft magnets can operate up to 700° C. without significant changes in its performance. Notice that any other soft and/or permanent magnetic material may be used instead. Electromagnetic interference (EMI) can be reduced to almost zero with an appropriate isolation system like an external magnetic yoke.

The damper of the present disclosure is able to simultaneously reduce transmissibility both at the low frequency and resonant regime as well as in the high frequency regime. This is absolutely different from any prior-art system.

Figure 3:
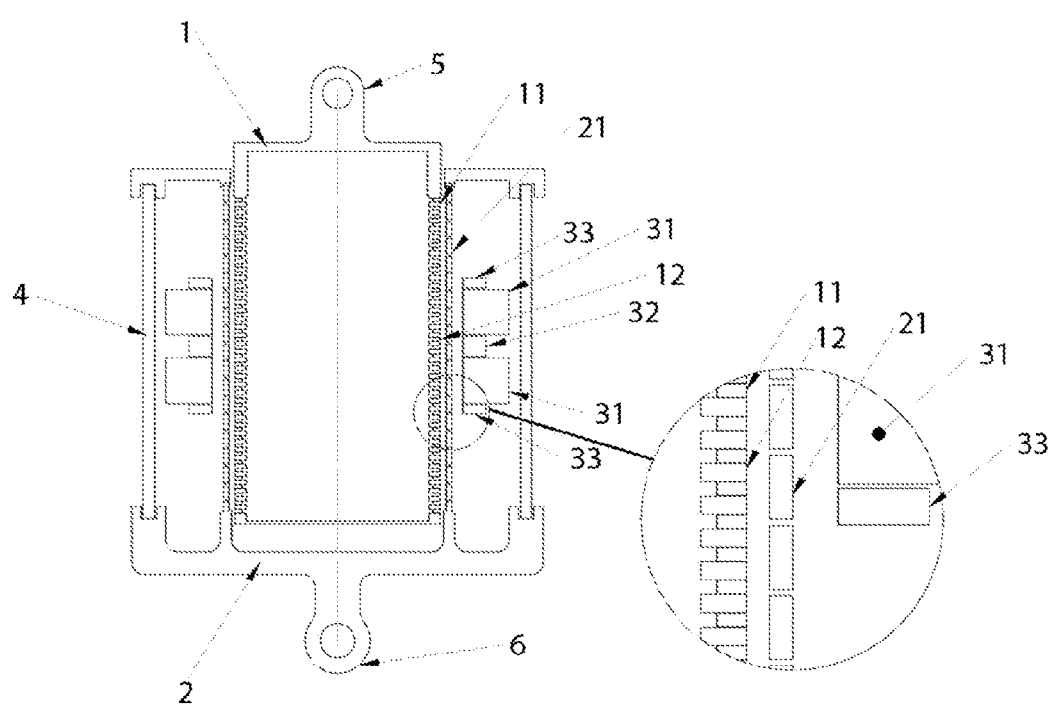
FIG. 3 depicts the cross-section of a second particular embodiment of the damper of the disclosure comprising additional soft magnets in the first and third coaxial elements, as well as a close-up of said cross-section.

FIG. 3 presents another preferred embodiment of the present disclosure in which both the slow-moving element (1) and the fast-moving element (3) are provided with additional rings of soft magnetic material. In particular, the fast-moving element (3) comprises a second soft magnet (32) between the two second permanent magnets (31), and third soft magnets (33) on top of and under the upper and lower second permanent magnets (31), respectively. The second soft magnet (32) and the third soft magnets (33) have the same inner diameter as the second permanent magnets (31) but a smaller outer diameter—optimally half the radial thickness of the second permanent magnets (31). The axial thickness of the second soft magnet (32) is preferably that of the space between contiguous second permanent magnets (31), and half that space for the third soft magnets (33). These geometries optimize the magnetic flux shape, the force transmission and the damping effect.

Additionally, the slow-moving element (1) comprises soft magnets (12) located between first permanent magnets (11). These additional soft magnets close the flux lines between the first permanent magnets (11) and optimize the maximum damping force available.

Figure 4:
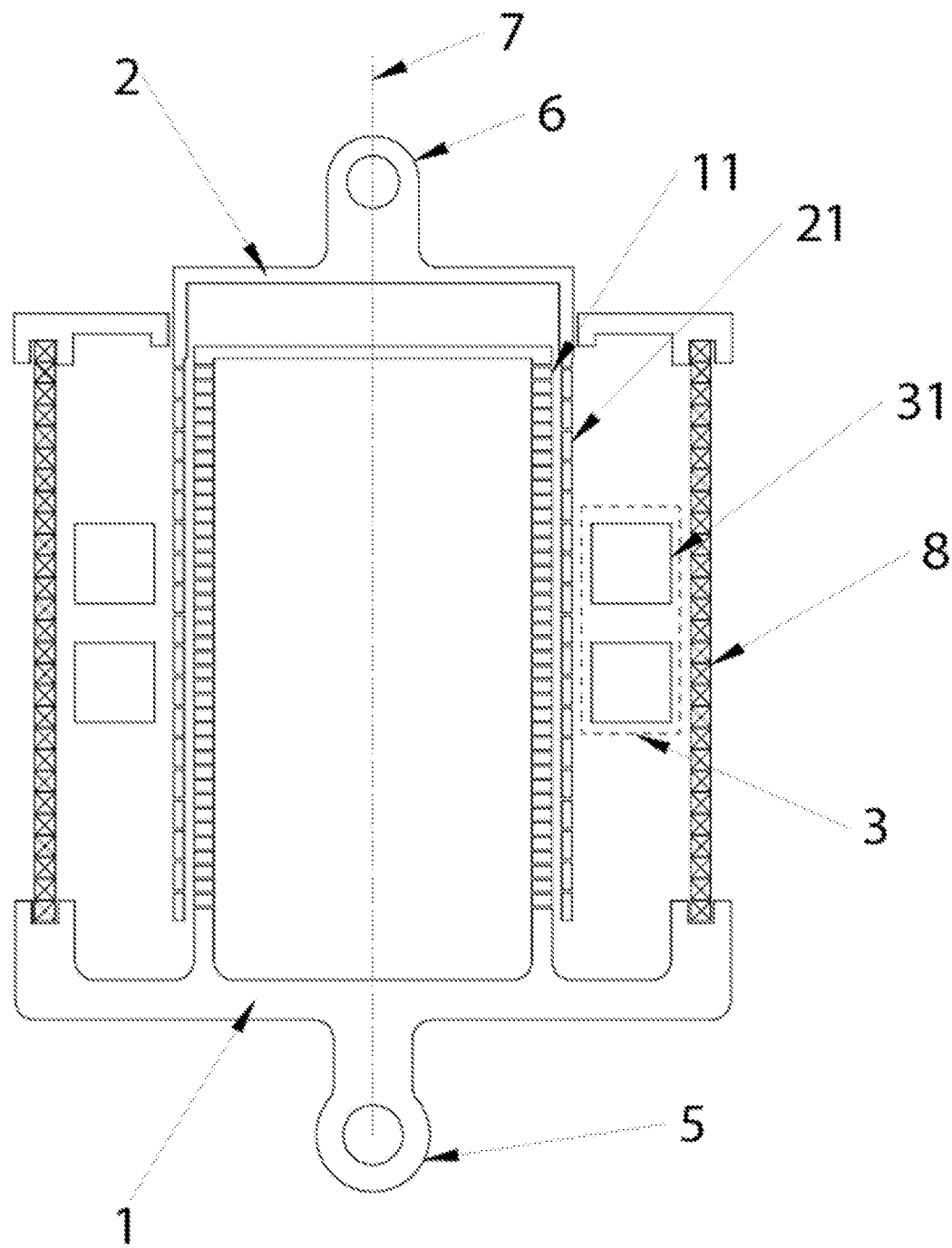
FIG. 4 illustrates the substitution of the conductive cylinder for coils, according to a third particular embodiment of the damper of the disclosure.

FIG. 4 presents an alternative embodiment, in which the conductive element (4) is substituted by a series of coils (8). When a vibration is provided between the first linkage means (5) and the second linkage means (6) an electromotive force is induced in the coils (8). The coils (8) comprise electrical terminals that can be connected to any kind of electrical load, impedance or circuit, hence using, storing or dissipating the generated electromotive force.

Building on the basic layer configuration of the previously disclosed preferred embodiments, more complex structures can be implemented within the scope of the disclosure. These complex structures may comprise additional magnet layers in the slow-moving element (1) and/or the stator (2), as well as multiple fast-moving elements (3). The order of the coaxial elements within the damper can also be altered. Notice that any particular feature or configuration disclosed for the basic configuration, such as alternating soft magnets, conductive elements (4), coils (8), etc., can also be applied to the more complex structures.

Figure 5:
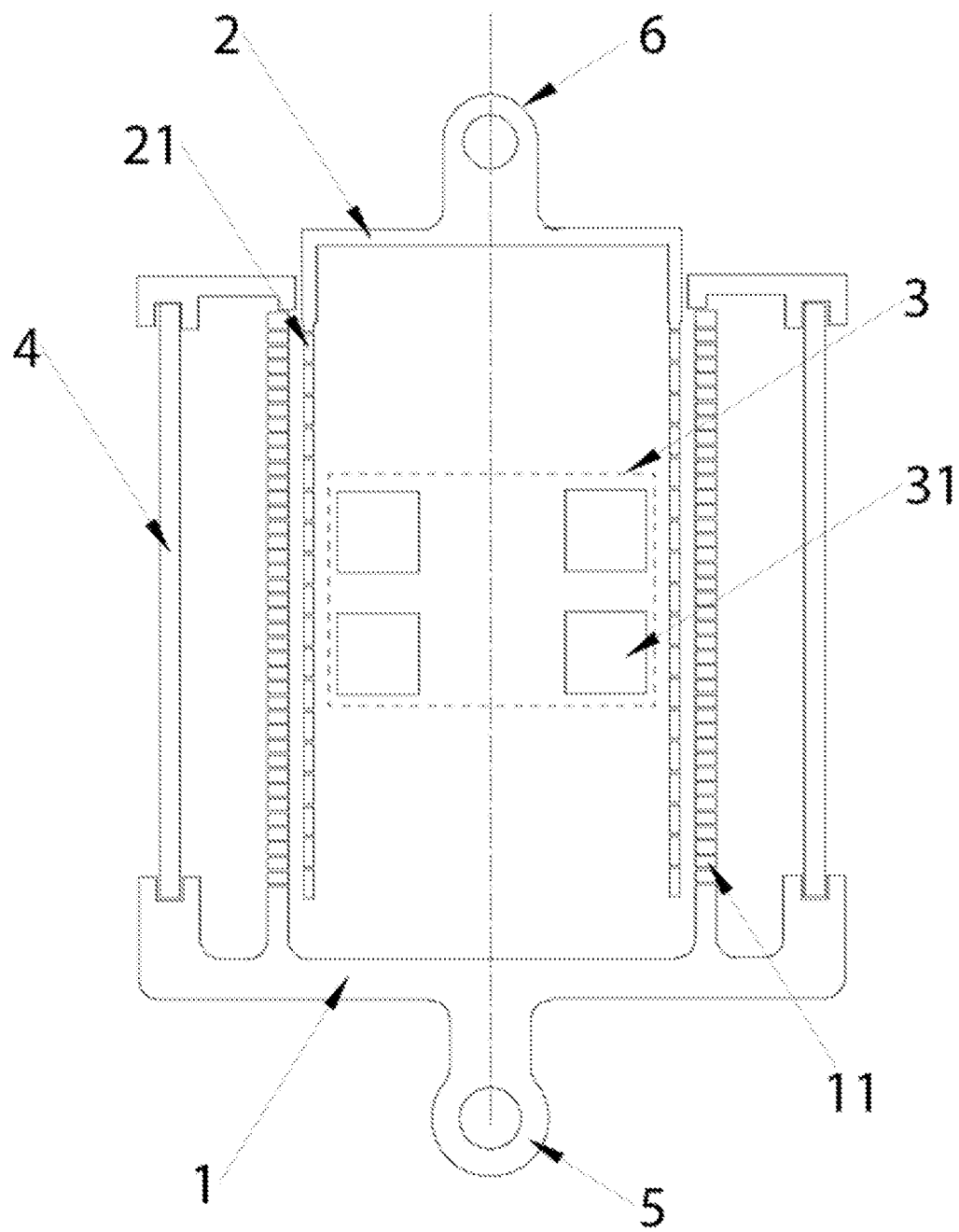
FIG. 5 shows yet another particular embodiment of the disclosure with the third coaxial element occupying the innermost position.

FIG. 5 illustrates another configuration example in which the order of the coaxial elements along the radial direction of the damper is inverted. That is, the first permanent magnets (11) of the slow-moving element (1) have a greater diameter than the first soft magnets (21) of the stator (2), and said first soft magnets (21) of the stator (2) have a greater diameter than the second permanent magnets (31) of the fast-moving element (3).

Figure 6:
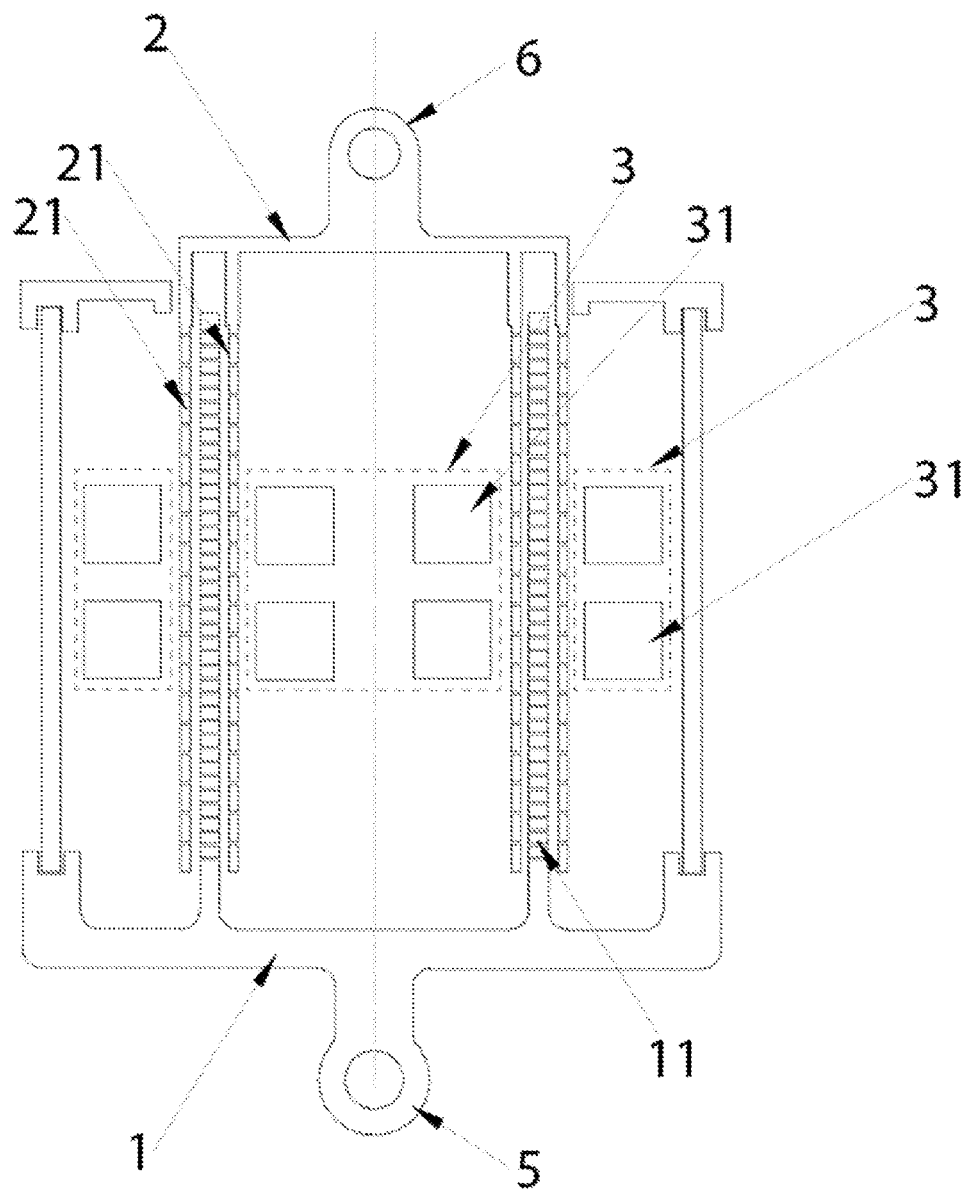
FIG. 6 presents another particular embodiment of the disclosure with third coaxial elements occupying both the innermost and outermost positions. Additional layer of first soft magnets is included between first and third coaxial elements.

FIG. 6 presents a first example of a multi-layer configuration with two fast-moving elements (3), one on each side of the first permanent magnets (11) of the slow-moving element (1). That is, there is a first couple of second permanent magnets (31) with a diameter smaller than the diameter of the first permanent magnets (11) and a second couple of second permanent magnets (31) with a diameter larger than said diameter of the first permanent magnets (11). Between each group of first permanent magnets (11) and the second permanent magnets (31), the stator (2) comprises a group of soft magnets (21) in order to induce the displacement multiplication.

Figure 7:
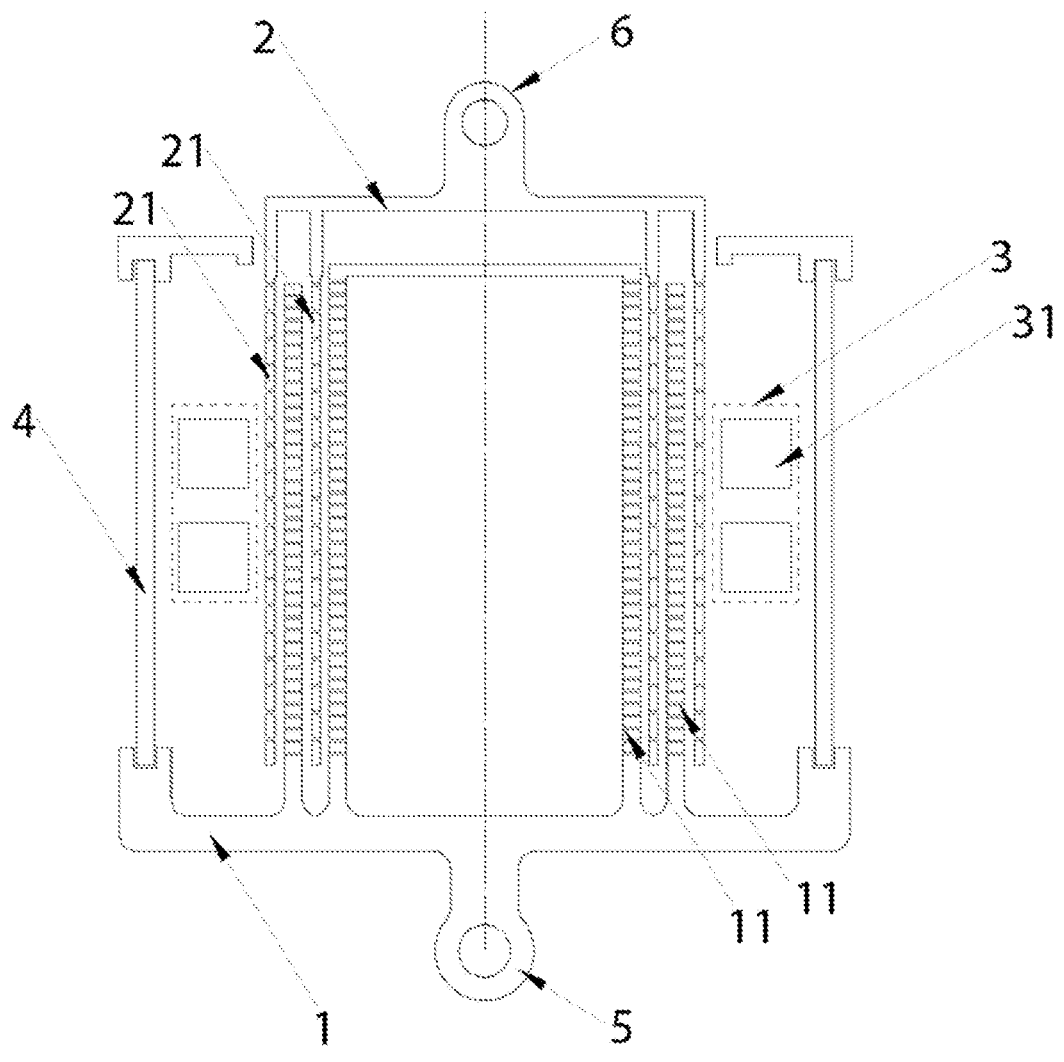
FIG. 7 depicts another particular embodiment of the disclosure with multiple consecutive layers of first permanent magnets and first soft magnets.

FIG. 7 shows another configuration with a single fast-moving element (3) but multiple layers of alternating first permanent magnets (11) and first soft magnets (21). In this particular example, the fast-moving element (3) occupies the outermost position (compared to the slow-moving element (1) and the stator (2)), but other implementations may comprise the fast-moving element (3) in the innermost position, or both in the innermost and outermost position.

Figure 8:
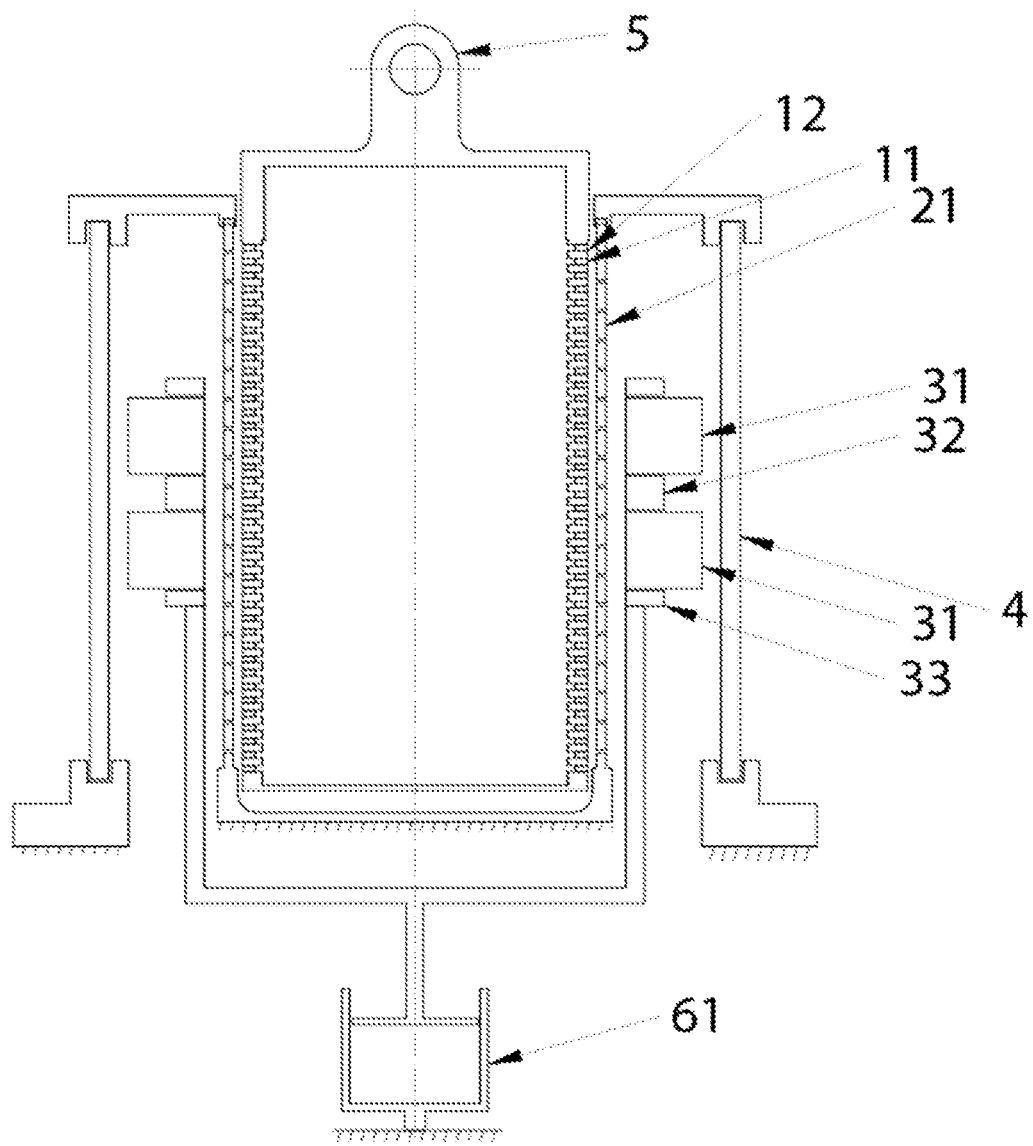
FIG. 8 shows the damper of FIG. 3 connected to another damper, such as a hydraulic or viscous damper.
Figure 9:
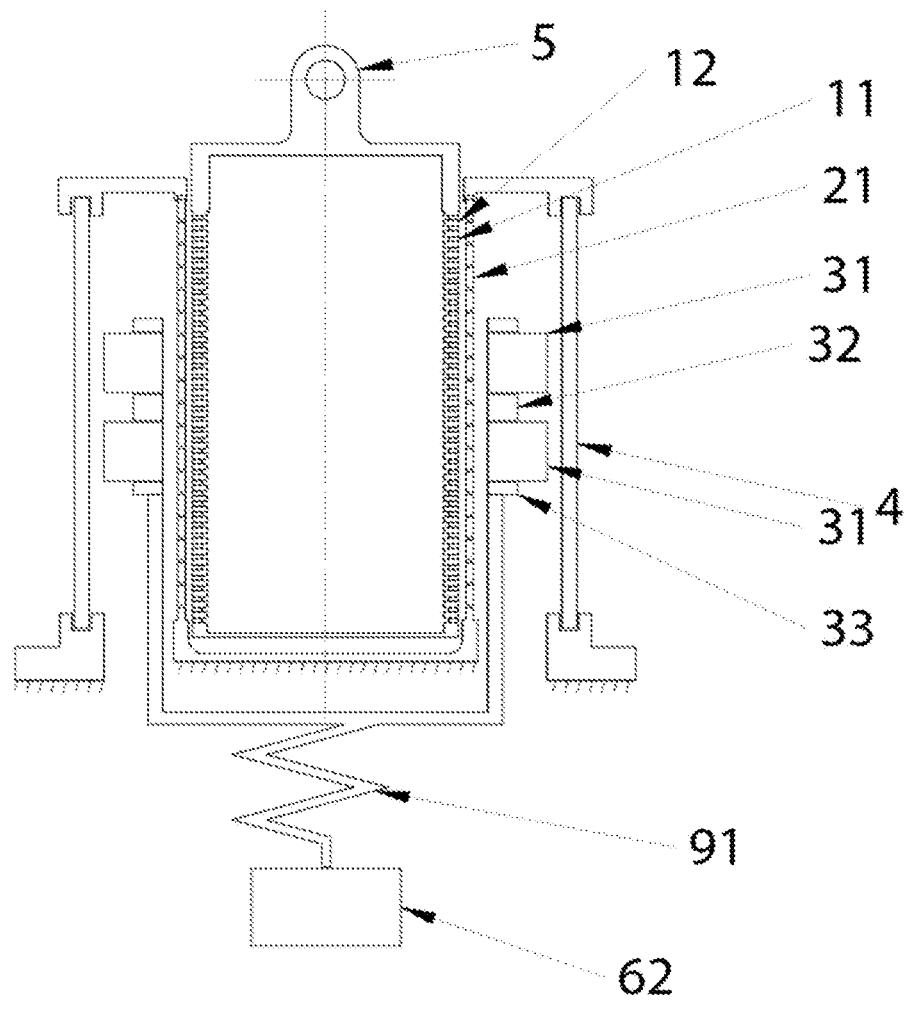
FIG. 9 shows the damper of FIG. 3, in this particular embodiment connected to a mass-spring damping system.

FIGS. 8 and 9 shows the damper depicted in FIG. 3, which is connected to an additional system. In the case shown in FIG. 8, the additional system is a hydraulic damper (61). With this specific configuration, the damping effect is improved thereby keeping the oil (or the corresponding viscous element) in the hydraulic damper (61) at adequate temperatures. And in the case shown in FIG. 9 the system is mass-spring tuned vibration absorber formed by a spring (91) and a mass (62). The impedance coupling given between the slow and the fast elements allows for a significant reduction in the size and requirements of the additional damping systems increasing the total performance of the device.

Figure 10:
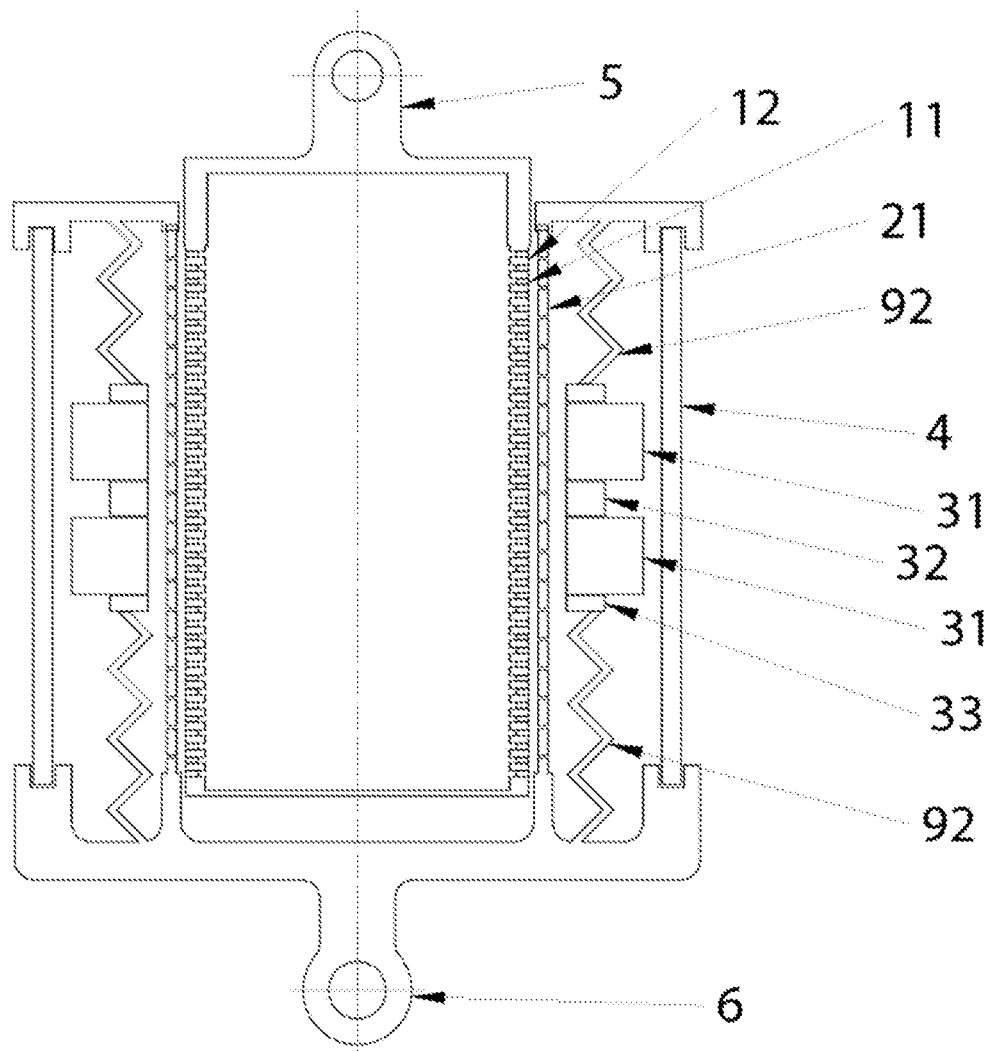
FIG. 10 shows a variant of the damper shown in FIG. 3, with the fast-moving element constrained by a spring.

FIG. 10 shows a variant of the damper shown in FIG. 3, with the movement of the fast-moving element (3) being connected to a spring (92). This combination increases the rigidity of the fast element improving the damping effect of the whole device. Those skilled in the art will understand that these are only some particular examples of multi-layered configurations, and that alternative configurations with greater number of layers of permanent and/or soft magnets, and/or different orders of layers can be implemented within the scope of the disclosure in order to achieve the desired technical effect. Also, when a coaxial element comprises multiple magnet layers, said layers can have either the same spacing or different spacings according to each particular implementation; as well as they can either be aligned axially (that is, each magnet of a layer having another magnet at the equivalent axial position in the other layer), or present axial shifts between layers. Furthermore, linkage means, conductive layer position and/or layer connections may vary in particular embodiments of the disclosure.

The matters defined in this detailed description are provided to assist in a comprehensive understanding of the disclosure. Accordingly, those of ordinary skill in the art will recognize that variation changes and modifications of the embodiments described herein can be made without departing from the scope and spirit of the disclosure. Also, description of well-known functions and elements are omitted for clarity and conciseness.

Note that in this text, the term "comprises" and its derivations (such as "comprising", etc.) should not be understood in an excluding sense, that is, these terms should not be interpreted as excluding the possibility that what is described and defined may include further elements, steps, etc.

In the context of the present disclosure, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

The invention claimed is:

1. Magnetic vibration damper comprising a first coaxial element, a second coaxial element, at least a third coaxial element and energy conversion means configured to dissipate mechanical energy, being the first coaxial element, the second coaxial element and the at least one third coaxial element mechanically configured to enable relative movements along a common axis, wherein:

the first coaxial element comprises at least a plurality of first permanent magnets equally spaced along the axis direction;

the second coaxial element comprises at least a plurality of first soft magnets equally spaced along the axis direction;

the at least one third coaxial element comprises at least two second permanent magnets, and the at least a plurality of first soft magnets being located between the at least a plurality of first permanent magnets and the at least two second permanent magnets in a direction perpendicular to the axis direction.

2. Magnetic vibration damper according to claim 1, wherein the at least one plurality of first permanent magnets of the first coaxial element and the at least two second permanent magnets of the third coaxial element are axially or radially polarized.

3. Magnetic vibration damper according to claim 1, wherein within a distance of twice a separation between the at least two second permanent magnets of the third coaxial element:

the plurality of first permanent magnets of the first coaxial element comprises a first integer number of magnets;

the plurality of first soft magnets of the second coaxial element comprises a second integer number of magnets; and the absolute difference between the first integer number and the second integer number equals one.

4. Magnetic vibration damper according to claim 1, wherein the energy conversion means comprises a kinetic to electric energy converter, a kinetic to thermal energy converter, and/or a kinetic to elastic energy converter.

5. Magnetic vibration damper according to claim 1, wherein the energy conversion means comprise an outer conductive element that dissipates eddy currents generated by magnetic flux variations.

6. Magnetic vibration damper according to claim 5, wherein the conductive element further comprises a plurality of fins that enhance dissipation of the eddy currents heat.

7. Magnetic vibration damper according to claim 1, wherein the third coaxial element further comprises at least a second soft magnet between the at least two second permanent magnets, and two third soft magnets in the extremes of the at least two second permanent magnets.

8. Magnetic vibration damper according to claim 7, wherein the at least one second soft magnet and the two third soft magnets of the third coaxial element have the same inner diameter as the at least two second permanent magnets and a smaller outer diameter as said at least two second permanent magnets.

9. Magnetic vibration damper according to claim 7, wherein the at least one second soft magnet and the two third soft magnets of the third coaxial element have half the radial thickness of the at least two second permanent magnets.

10. Magnetic vibration damper according to claim 7, wherein the at least one second soft magnet has double the axial thickness of the two third soft magnets of the third coaxial element.

11. Magnetic vibration damper according to claim 1, wherein the first coaxial element further comprises at least a plurality of fourth soft magnets, being the fourth soft magnets and the first permanent magnets disposed alternately along the axis direction.

12. Magnetic vibration damper according to claim 1, wherein the third coaxial element comprises at least two second permanent magnets with a smaller diameter than the diameter of the at least one plurality of first soft magnets of the second coaxial element.

13. Magnetic vibration damper according to claim 1, wherein the third coaxial element comprises at least two second permanent magnets with a greater diameter than the diameter of the at least one plurality of first soft magnets of the second coaxial element.

14. Magnetic vibration damper according to claim 1, wherein the damper comprises a first third coaxial element with a greater diameter than the diameter of the at least one plurality of first soft magnets of the second coaxial element, and a second third coaxial element with a smaller diameter than the diameter of the at least one plurality of first soft magnets of the second coaxial element.

15. Magnetic vibration damper according to claim 1, wherein the first coaxial element comprises multiple pluralities of first permanent magnets and the second coaxial element comprises multiple pluralities of first soft magnets, being the multiple pluralities of first permanent magnets and the multiple pluralities of soft magnets disposed alternately along a direction perpendicular to the axis direction.

* * * * *